Figure 1:
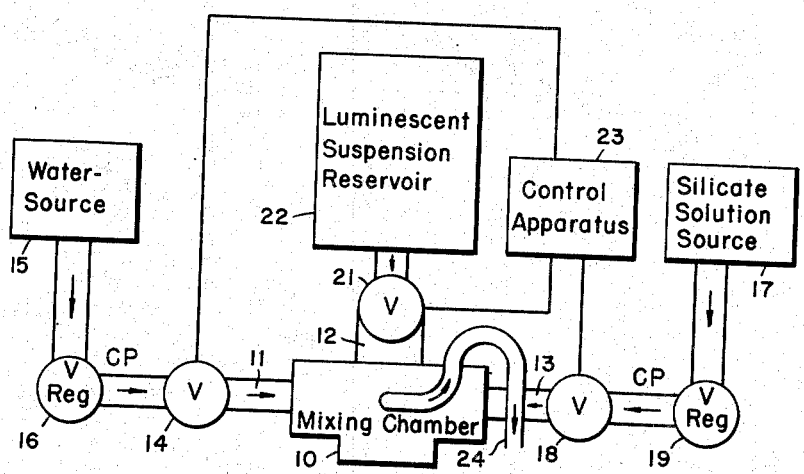

Aug. 25, 1953

J. J. O'CALLAGHAN 2,650,199

METHOD OF MIXING AND DISPENSING A LUMINESCENT
COATING COMPOSITION

Filed Jan. 15, 1952

INVENTOR:
JEROME J. O'CALLAGHAN
BY
Francis W. Crotty
HIS ATTORNEY.

Patented Aug. 25, 1953

2,650,199

UNITED STATES PATENT OFFICE 2,650,199

METHOD OF MIXING AND DISPENSING A LUMINESCENT COATING COMPOSITION

Jerome J. O'Callaghan, Skokie, Ill., assignor to The Rauland Corporation, a corporation of Illinois Application January 15, 1952, Serial No. 266,494

3 Claims. (Cl. 252—301.4)

This invention relates to an improved method of mixing and dispensing a luminescent coating composition. The invention is particularly valuable in the preparation of a luminescent coating composition used to form an image screen on the face plate of a cathode-ray tube and will, therefore, be described in that connection.

In the mass production of cathode-ray tubes, which has been brought about by the recent demand for television receivers, it has been found advantageous to settle the luminescent material which forms the screen through a liquid medium containing material to serve as a binder for the screen. Frequently, the liquid through which the luminescent material is settled is a silicate solution; potassium silicate is suitable, although it is possible to use ammonium silicate and other members of the waterglass group. Best results have been achieved through a process in which the luminescent material, in pulverized form, is first mixed with water to form a suspension which is mixed with a silicate solution and water prior to introducing the composition into the tube envelope. The multiplicity of types and sizes of cathode-ray tubes which have been utilized and are being utilized in television receivers presents the tube manufacturer with several difficult problems in connection with the mixing and dispensing process, since different sizes and shapes of tubes require not only varying quantities of the composition but also a varying proportionality of luminescent suspension material and silicate solution. There is a definite need for a process which facilitates mixing these ingredients in varying amounts and in varying proportionalities without requiring a multiplicity of storage tanks for various coating compositions. The manufacturer's problems are further complicated by the fact that the silicate solution, on coming into contact with air, tends to form minute silica crystals which give rise to irregularities in the composition of the screen formed on the cathode-ray tube face and also cause rapid deterioration, through abrasive action, in any equipment used to dispense solutions or suspensions in which they are present.

It is an object of this invention, therefore, to provide an improved process for mixing the ingredients of a luminescent coating composition in varying proportionality and varying volumes which is efficient in operation and obviates the necessity for multiple storage facilities.

It is a further object of this invention to provide a process which will preserve the materials of the composition in a substantially uncontaminated state.

In accordance with the invention, the process of mixing and dispensing a luminescent coating composition including, as ingredients, predetermined quantities of a suspension of luminescent material, a silicate solution, and water, comprises establishing a flow of each of the ingredients into a common mixing chamber and regulating the flow of each of the ingredients to a preselected rate. The admixture thus formed is discharged from the mixing chamber in timed relation to the influx of the ingredients. After the flow of the suspension of luminescent material and of the silicate solution into the mixing chamber is selectively terminated to obtain the desired predetermined quantities, the influx of water is continued, thus flushing the chamber. After flushing the chamber, the discharge from the mixing chamber is terminated, as is the influx of water, leaving said mixing chamber filled with water and effectively preventing entry of air thereinto.

Figure 2:
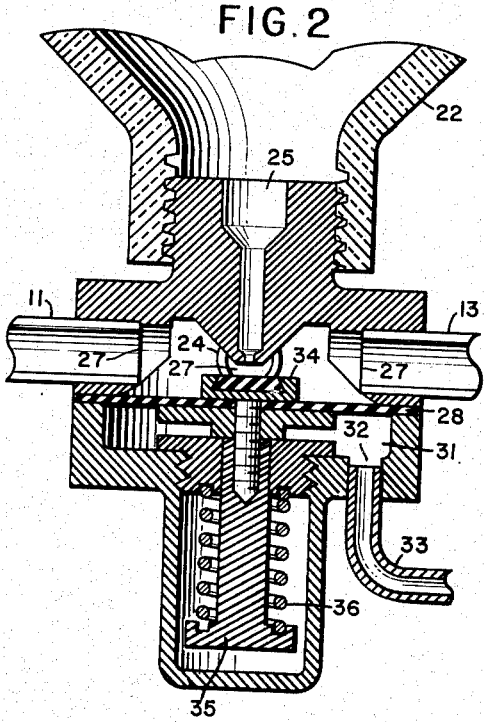

The features of the present invention which are believed to be novel are set forth with particularity in the appended claims. The invention, together with further objects and advantages thereof, may best be understood, however, by reference to the following description taken in connection with the accompanying drawing, in the several figures of which like reference numerals indicate like elements, and in which:

Figure 1 is a schematic representation of equipment which may be utilized in practicing the process and of the flow of ingredients during the process; and Figure 2 is a sectional view of a particular type of mixing chamber which has proved most advantageous in practicing the process.

In Figure 1 a common mixing chamber 10 is connected to three incoming conduits 11, 12 and 13. A metering valve 14 is interposed in conduit 11 to measure the amount of water passing through the conduit from a source 15. A pressure regulating valve 16 is also in circuit with conduit 14 and regulates the pressure of water in that portion of conduit 11 between regulating valve 16 and metering valve 14, thus effectively regulating the flow of the water to a preselected rate. Mixing chamber 10, through conduit 13, is similarly connected to a source of silicate solution 17 through a metering valve 18 and a pressure regulating valve 19, which valves perform functions identical with respect to the flow of the silicate solution as are performed by valves 14 and 16 with respect to the water. Mixing chamber 10 is also connected by means of conduit 12 to a metering valve 21, which in turn is in circuit with a reservoir 22 containing a liquid suspension of pulverized luminescent material. Valves 14, 18 and 21 are all connected to a central control apparatus 23; if these valves are of the solenoid-operated type, control apparatus 23 may comprise a group of timing relays connected in the energizing circuits of the solenoids to control actuation of the valves in conventional manner. More specifically, the relays may be actuated to energize the solenoids and open the valves and to automatically de-energize the solenoids at preselected times and in a predetermined sequence. A discharge tube 24, preferably of gooseneck construction as shown, provides an outlet for mixing chamber 10.

In practicing the process, the sources of silicate solution and water are connected to metering valves 14 and 18 respectively and the pressures at the metering valves are maintained at preselected values by means of constant pressure valves 16 and 19. The suspension of luminescent material is maintained at a constant pressure in reservoir 22. While the means for maintaining this pressure has not been shown, constant pressure may be effected through the connection of a source of compressed gas such as nitrogen to the tank, through the maintenance of a sufficient hydrostatic head in the reservoir, or through other suitable means. The operating pressures under which the various ingredients are maintained should be substantially equal to prevent possible back-up of material from the mixing chamber into the conduits and to facilitate a controlled flow of the ingredients into the mixing chamber. It has been found that a pressure of approximately 5 pounds per square inch over atmospheric is quite satisfactory; however, this value is not critical as long as the pressures of the various ingredients are maintained approximately equal.

At the start of the process, the common mixing chamber 10 is completely filled with water. The timing relays of control apparatus 23 are then energized to open metering valves 14, 18 and 21 and establish a flow of each of the ingredients into the common mixing chamber 10, the rate of flow being regulated by valves 16 and 19 and by the constant pressure means associated with reservoir 22. After a preselected time interval determined by the admixture desired, one of the timing relays of control apparatus 23 automatically trips to close valve 18 and terminate the flow of the silicate solution into the mixing chamber. Since the solution is flowing under a predetermined pressure through metering valve 18, the action of the control apparatus in closing valve 18 automatically determines the amount of the silicate solution admitted to the mixing chamber in a mixing cycle. Control apparatus 23 concurrently controls the closing of valve 21 to determine the amount of the luminescent suspension material admitted into mixing chamber 10. Adjustment of the timing elements of the control relays in apparatus 23 controls the quantity of each of the ingredients flowing into the mixing chamber during a given mixing cycle and makes possible the mixing and dispensing of luminescent coating compositions of varying volume and proportions in accordance with the requirements of various sized cathode-ray tubes.

The luminescent coating admixture formed in mixing chamber 10 is continuously dispensed through discharge tube 24 throughout the mixing process. After the flow of the luminescent suspension material and the silicate solution has been terminated, the flow of water from source 15 is permitted to continue in order to flush all remnants of the two other ingredients from the mixing chamber. After the mixing chamber has been adequately flushed, control apparatus 23 closes valve 14 and interrupts the flow of water. Termination of the water flow automatically interrupts the discharge through tube 24, since the goose-neck construction of the tube prevents water flowing from the chamber after the upper portion of the neck has emptied. This method of terminating the discharge from the mixing chamber serves the further purpose of leaving the mixing chamber completely filled with water and effectively prevents the entry of air into the mixing chamber. This is highly desirable in view of the tendency of the silicate solution to form silica crystals upon coming in contact with air. These crystals, as previously noted, are highly abrasive and cause rapid deterioration of the mixing apparatus as well as contamination of the luminescent coating composition unless their formation is prevented. The process may be operated by introducing the luminescent material into the mixing chamber through a conduit and valve system such as used in conjunction with the water and silicate solution. However, since this ingredient is not a solution, but merely a suspension subject to settling if not agitated, it is preferable to avoid any lengthy conduit system in which the luminescent material might settle out in transit. The luminescent suspension reservoir 22 has, therefore, been shown directly above and closely coupled to mixing chamber 10 since this arrangement is most efficient. One specific form of mixing chamber, shown in section in Figure 2, facilitates this close coupling and combines the functions of metering valve 21 and mixing chamber 10. A metering orifice 25 opens into reservoir 22 and leads into a mixing chamber. Three apertures 27 are provided in the side of the mixing chamber; one is connected to conduit 13 for admitting the silicate solution into the mixing chamber, a second is connected to the water line 11, and the third is connected to discharge tube 24. A flexible diaphragm 28 seals off the mixing chamber from an air chamber 31 having an opening 32 to which is connected an air line 33. Air line 33 extends to a source of compressed air through a shut-off valve controlled from control apparatus 23, the source of compressed air and the shut-off valve not being shown. A valve plunger 34 is mounted on diaphragm 28 and fixed to an operating rod 35. A spring 36 is operatively connected to rod 35 to bias rod 35 and plunger 34 in a direction away from metering orifice 25. This type of combined metering chamber and air actuated valve permits close coupling of the luminescent suspension reservoir to the mixing chamber.

At the beginning of the dispensing process, assuming the structure of Figure 2 to be used, control apparatus 23 shuts off the source of compressed air from air line 33. Spring 36, acting on operating rod 35, moves plunger 34 to the position shown in the drawing, in which it is free of metering orifice 25, thus establishing a flow of the luminescent suspension material from reservoir 22 into the mixing chamber. After a predetermined time, control apparatus 23 opens the shut-off valve in air line 33, and air pressure forces diaphragms 28 and plunger 34 toward the opening of orifice 25 until plunger 34 contacts the opening. This action effectively seals orifice 25 and prevents further flow of the luminescent suspension material into the mixing chamber.

The remaining steps of the process are identical with those described in connection with Figure 1.

Thus the invention provides a process which permits the mixing of ingredients for a luminescent coating composition of varying proportions and varying volume. This process has been found most efficient in operation and obviates any necessity for individual storage facilities for compositions of varying proportionality. The process further prevents contact of air with the silicate solution and inhibits the formation of silica crystals which would contaminate the coating composition and cause rapid wearing and deterioration of the mixing apparatus.

While a particular embodiment of the present invention has been shown and described, it will be obvious to those skilled in art that changes and modifications may be made without departing from this invention in its broader aspects and, therefore, the aim in the appended claims is to cover all such changes and modifications as may fall within the true spirit and scope of the invention.

I claim:

1. The process of mixing within and discharging from a common mixing chamber a luminescent coating composition including, as ingredients, predetermined quantities of a suspension of luminescent material and a silicate solution, and water, which process comprises the steps of: establishing a flow of each of said ingredients into said mixing chamber and regulating the flow of each of said ingredients to an assigned preselected value; discharging the admixture from said mixing chamber in timed relation to the influx of said ingredients; selectively terminating the flow of said suspension of luminescent material and of said silicate solution into said mixing chamber to obtain said predetermined quantities thereof while continuing the influx of water to flush said chamber; and thereafter terminating the discharge from said mixing chamber and the influx of water, leaving said mixing chamber filled with water and effectively preventing entry of air thereinto.

2. The process of mixing within and discharging from a common mixing chamber a luminescent coating composition including, as ingredients, a suspension of luminescent material, a silicate solution, and water, which process comprises the steps of: completely filling said mixing chamber with water; establishing a flow of each of said ingredients into said mixing chamber and regulating the flow of each of said ingredients to a preselected value; discharging the admixture from said mixing chamber concomitantly with the influx of said ingredients; terminating the flow of said suspension of luminescent material and of said silicate solution into said mixing chamber while continuing the influx of water to flush said chamber; and thereafter simultaneously terminating the discharge from said mixing chamber and the influx of water, leaving said mixing chamber filled with water, thus effectively preventing the entry of air thereinto.

3. The process of mixing and dispensing a luminescent coating composition including as ingredients an aqueous suspension of luminescent material, an aqueous silicate solution, and water, which process comprises the steps of: establishing a flow of each of said ingredients into a common mixing chamber normally filled with water and regulating the flow of each of said ingredients to a preselected value; discharging the admixture from said mixing chamber concomitantly with the influx of said ingredients; terminating the flow of said suspension of luminescent material and of said silicate solution into said mixing chamber while continuing the influx of water to flush said chamber; and thereafter simultaneously terminating the discharge from said mixing chamber and the influx of water, leaving said mixing chamber filled with water, thus effectively preventing the entry of air thereinto.

JEROME J. O'CALLAGHAN.

References Cited in the file of this patent

UNITED STATES PATENTS

| Number | Name | Date |
| --- | --- | --- |
| 1,954,261 | Pierce | Apr. 10, 1934 |